Aug. 18, 1970 R. P. CRIST 3,524,347
EXPENDABLE BATHYTHERMOGRAPH FOR SUBMARINES AND DEVICE FOR LAUNCHING
Filed July 31, 1968 2 Sheets-Sheet 1
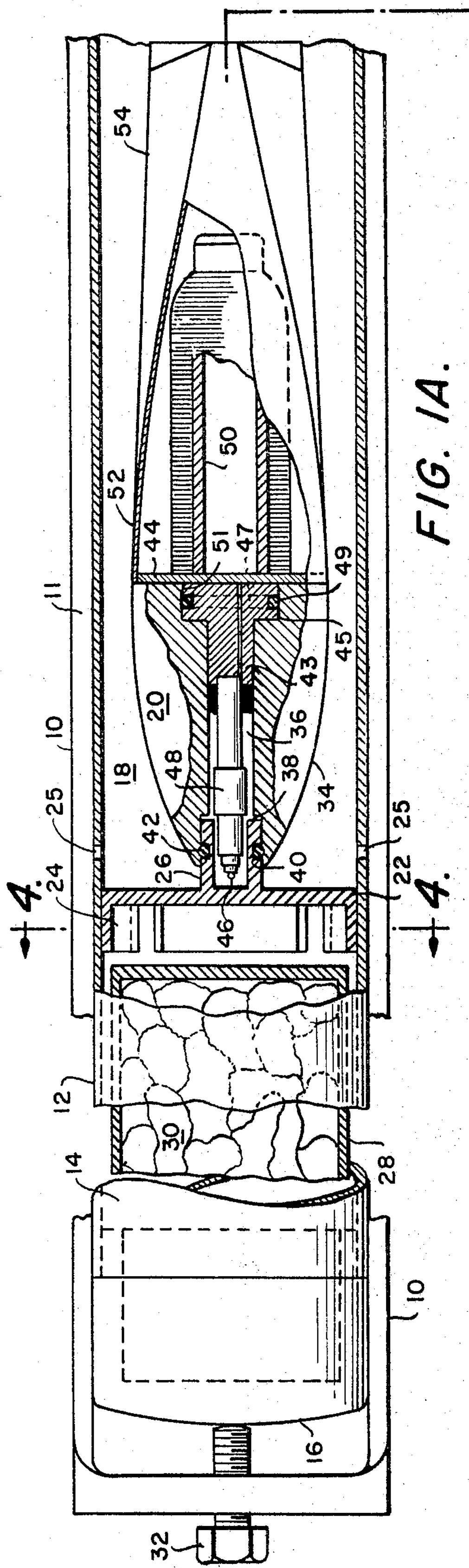
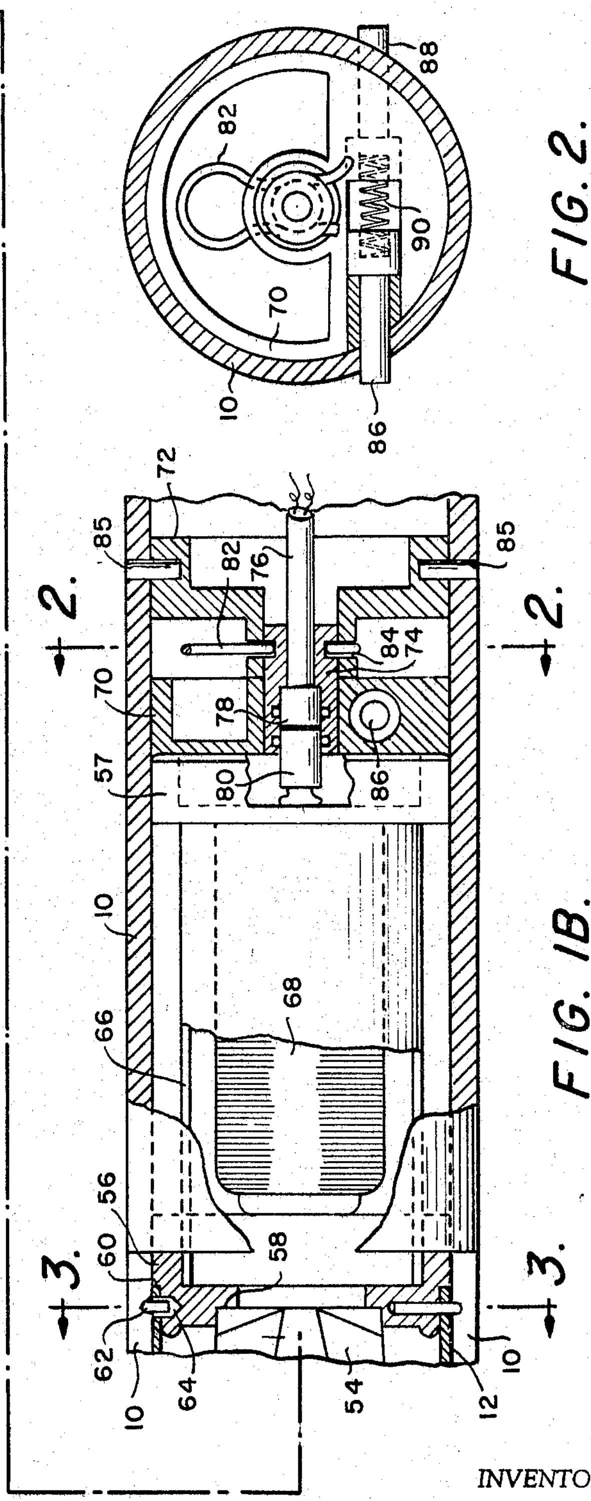
INVENTOR
RALPH P. CRIST
BY [signature]
ATTORNEY

INVENTOR
RALPH P. CRIST

BY [signature]

ATTORNEY

United States Patent Office 3,524,347
Patented Aug. 18, 1970

3,524,347

EXPENDABLE BATHYTHERMOGRAPH FOR SUBMARINES AND DEVICE FOR LAUNCHING

Ralph P. Crist, Harrisburg, Pa., assignor to the United States of America as represented by the Secretary of the Navy Filed July 31, 1968, Ser. No. 749,102
Int. Cl. B63b *21/52*
U.S. Cl. 73—170 9 Claims

ABSTRACT OF THE DISCLOSURE

Apparatus for launching a sensor probe for measuring properties of water from a submerged submarine vehicle in which the probe is releasibly attached to a buoyant cannister which is carried in a launcher which may be extended through the vehicle hull. The sensor is connected to instrumentation aboard the vehicle by electrical conductors releasibly wound on a spool carried by the sensor probe.

The probe is extended outside the vehicle by the launcher and is released and floats to the water surface. At or near the surface, the probe is released from the float and falls freely to the ocean floor unreeling wire from the spool during ascent and free fall. Since the rate of fall of the sensor probe is a known constant, an accurate representation of the specific water property versus depth is obtained.

The invention described herein may be manufactured and used by or for the Government of the United States of America for governmental purposes without the payment of any royalties thereon or therefor.

BACKGROUND OF THE INVENTION

This invention relates to apparatus for launching a sensor in a fluid atmosphere for measuring properties of the fluid. More particularly the invention relates to apparatus for launching sensors from a submerged submarine vehicle for measuring properties of the water in the vicinity of the vehicle.

Submarine vehicles, while operating submerged, rely heavily on sonar for detection of other vehicles or underwater objects. Sonar communication requires accurate and up-to-date information on the properties of the water in which the vehicle is operating and in particular water temperature versus depth in order to evaluate sonar information received.

The prior art devices provide a weighted aerodynamic shaped body which carries a temperature sensor exposed to the ambient water. The rate at which the body falls in water is a known constant and by plotting the sensed temperature versus time of fall an accurate representation of water temperature versus depth can be obtained. Such a device is described in U.S. Pat. No. 3,339,407. These devices are arranged to provide a signal at the moment the sensor becomes exposed to seawater. This signal is then used to activate recording instruments aboard the launching vehicle. These devices were designed to be launched from a vehicle on the surface and hence were not suitable for submarine launching.

In the prior art in which these devices have been adapted for underwater launching, the sensor has been attached to an evacuated rigid float member and stored aboard the submarine in the assembled condition. In operation the assembled float and probe were removed from the storage area, assembled into a launching tube of the submarine by which the assembly was ejected into the water. Prior to launching, the probe is electrically connected to recording instrumentation aboard the submarine through fine multiconductor cables wound upon two spools connected in series and carried within the assembly. One spool is carried within the probe body while a second spool, connected in series with the first, remains in the launching tube. Upon ejection from the vehicle the float carries the probe toward the water surface unreeling wire from the two spools. At the water surface, or at a predetermined depth below the surface, the hydrostatic pressure becomes lessened to a point where the probe drops free from its float. Upon contact with the seawater the recording equipment aboard the vehicle is activated and the probe falls freely as described above.

One of the disadvantages of the prior art devices is that the connection between the probe and its float must be maintained air-tight through handling prior to storage and during launching. Should the seal be broken the assembly is inoperative for its intended purpose. Secondly, the use of a rigid float member limits the depths at which the probe may be launched since the float container must be able to withstand the hydrostatic pressure at the launching depth or it will collapse when exposed to the ambient sea pressure. Thirdly, the use of a rigid pre-evacuated float predetermines the rate at which the assembly will rise to the surface.

It is desirable in such a device to be able to regulate the rate of rise depending upon the situation at launch. When launching from great depths it is desirable to have as rapid a rate of rise as possible to minimize the time required to take the necessary measurements. In other instances a lower rate of rise may be desirable in order to prevent the trailing wire from the probe from becoming entangled in the superstructure of the vehicle when the probe is launched with the vehicle underway. The present invention overcomes these disadvantages by providing a float member open at one end to the sea which is charged with buoyant gas at the time of launch. This feature eliminates the need for maintaining a vacuum-tight seal during handling and storage and further allows the rate of rise of the assembly to be regulated according to the requirements at launch by regulating the amount of gas used to charge the float. Since the float remains open to the seawater at the bottom the problem of hydrostatic pressure crushing the float member is eliminated.

SUMMARY OF THE INVENTION

The invention described herein provides apparatus for launching a sensor probe from a submerged vehicle and carrying it to the water surface by a buoyant float member. At the surface or at a predetermined depth beneath the surface the sensor probe is released from its float member and allowed to fall free through the water. The sensor measures specified properties of the water and transmits the measurements to the vehicle by means of an electric conductor connected between the probe and the vehicle. Since the rate of fall of the probe body through the water is known, measurements made by the sensor may be correlated with water depth aboard the submarine.

This invention provides for adjusting the rate of rise of the probe and float assembly by regulating the buoyancy of the float member prior to launch. There is provided means for automatically charging the float member with buoyant gas upon exposure to seawater or for charging the float from an external gas supply. Additionally the float may be provided in the form of a flexible inflatable member which may be stored in a collapsed state aboard the vehicle for conservation of storage space.

There is further provided apparatus for ejecting the float and probe assembly from the vehicle and for separation and disposal of expendible auxiliary equipment from the vehicle launching tube after the probe has been launched.

It is therefore an object of this invention to provide apparatus for launching a sensor probe for measuring properties of a fluid from a vehicle submerged in the fluid.

It is further an object of this invention to provide a buoyant float for carrying a sensor to the water surface and in which the buoyancy of the float may be adjusted.

It is another object of this invention to provide the sensor float assembly in which the float is made buoyant by generation of a buoyant gas upon contact with seawater.

It is yet another object of this invention to provide a sensor float combination in which the float member is an inflatable flexible container.

It is a further object of this invention to provide apparatus for ejecting a sensor float assembly from a submerged vehicle and for retracting said apparatus after launching.

Other objects and many of the attendant advantages of this invention will be readily appreciated as the same becomes better understood by reference to the following detailed description when considered in connection with the accompanying drawings wherein:

FIG. 1A is a view in partial section of the forward portion of the probe and float assembly installed in the launching apparatus.

FIG. 1B is a view in section of the rear portion of the probe and float in the launching apparatus.

FIG. 2 is a view in section taken along line 2—2 of FIG. 1B.

DESCRIPTION OF THE PREFERRED EMBODIMENT

Figure 4:
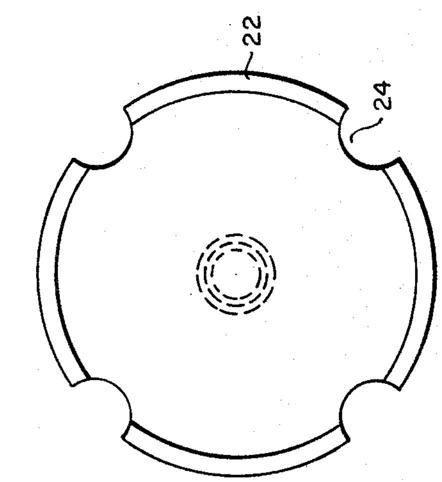
FIG. 4 is a view in section taken along line 4—4 in FIG. 1A.

Referring now to FIGS. 1A and 1B there is shown a launcher rack 10 into which the canister 12 is assembled for launching. The launcher 10 is generally tubular in shape and has an open portion 11 of semicircular cross section extending from near the forward portion of the launcher to the end of the cannister 12. The cannister is divided into two portions, the forward portion 14 is covered by cap member 16 and forms a hollow float body. The rear portion of the cannister 18 contains the probe member 20. The two portions of the cannister are separated by a wall member 22 which is shown in detail in FIG. 4. The wall member which is fastened to the cannister has a plurality of openings 24 in the outer periphery thereof providing communication between the forward and aft portions of the cannister. In addition the wall member has a spindle member 26 extending into the aft portion of the cannister to which the probe member is attached.

Immediately aft of wall member 22 there is provided a series of openings 25 in the cannister wall. These openings, in conjunction with openings 24 in wall member 22 provide a channel between the outside of the cannister and the float portion thereof. The function of this channel is explained in the description of the operation of the device given below.

Referring again to the forward portion of the cannister, there is placed in the cannister a water soluable bag 28 which contains a dry chemical generally indicated at 30 of a type which generates buoyant gas upon exposure to water; for example lithium hydride. At the forward end of the launcher there is provided a restraining means for illustrated in FIG. 1B as a threaded screw shown at 32.

In the aft portion of the cannister the probe 20 is releasibly attached to the spindle 26 projecting from the wall member 22. The head member 34 comprising the forward portion of the probe is an aerodynamic shaped member made of a heavy material such as lead. The head member 34 has a central bore therethrough indicated at 36 with a slightly enlarged opening at the forward end thereof indicated at 38. The spindle member is provided with a peripheral groove 40 into which is assembled an O-ring seal 42. The enlarged opening of the head member fits snugly over the spindle 26 with the O-ring 42 forming a water-tight seal between the spindle and the central bore in the head. Mounted in the rearward opening of the central bore 36 is a spindle member 43 having a shoulder 45 with a groove 47 therein which carries a second O-ring 49. The shoulder and its O-ring fit in sealing engagement into recess 51 in the rear face of the head member. A flange member 44 abuts the rear face of the head 20 and is attached to spool 50. At the forward end of the spindle 42 there is mounted a sensor member 46 for sensing the properties of the fluid to be measured. Aft of the sensor member is a metal ring 48 which is connected in the circuit with the sensor member and forms a seawater return for the circuit. Aft of the flange 44 there is provided a spool member 50 upon which a predetermined amount of electrical conductor cable is wound. The electrical conductor, which connects the sensor and seawater return to instrumentation aboard the submarine, is wound upon the spool in such a manner that it may freely unwind from the spool with application of a small amount of tension at the end of the cable. Enclosing the spool member and extending from the flange 44 rearward is a thin light housing member made of plastic or similar material which covers the wire spool and provides stabilizing fins 54 at the rear portion of the probe.

Figure 3:
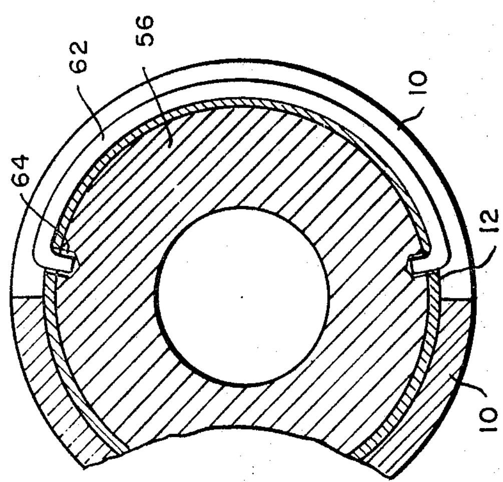
FIG. 3 is a view in section taken along line 3—3 in FIG. 1B.

Referring now to FIG. 1B there is shown at the left side thereof a second wall member 56. The stabilizing fins 54 of the probe housing fit loosely into recess 58 of the wall member 56 and the rearward portion of the cannister 12 is assembled in recess 60 in wall member 56. The cannister is releasably attached to the wall member by means of clips 62, the ends of which extend through holes provided in the cannister wall into opening 64 provided in the wall member. The clip member shown in detail in FIG. 3 is generally semicircular in shape being slightly less than 180° from end to end to facilitate removal at launching time.

Aft of wall member 56 there is provided a second cannister 66 which is maintained within the launcher by wall members 56 and a third wall member 70. The second cannister 66 contains a second spool 68 wound with a predetermined amount of conductor wire similar to spool 50 contained within the probe member. The two spools are connected in series to form a continuous length of conductor.

A fourth wall member 72 is provided in the launcher and carries the spindle 74 which connects wall member 72 and wall member 70. Spindle 74 has a central opening therethrough in which cable member 76 is positioned. Cable 76 terminates in a connector half 78 mounted in an enlarged portion of the spindle opening. A mating connector half 80 is connected at one end to the conductors wound upon spool 68 and at its other end, to connector half 78. The spindle member 74 is retained in the housin by means of spring clip 82 assembled into groove 84 in the wall member 72. The wall member 72 is fastened to the launcher 10 by means of pins 85 which extend through the launcher wall into the wall member 72.

There is included in wall member 70 a pair of pins 86 and 88 slidably mounted in the wall member and biased outwardly by spring 90. The function of these pins and their operation is described in the description of the operation of the device given below.

Figure 5:
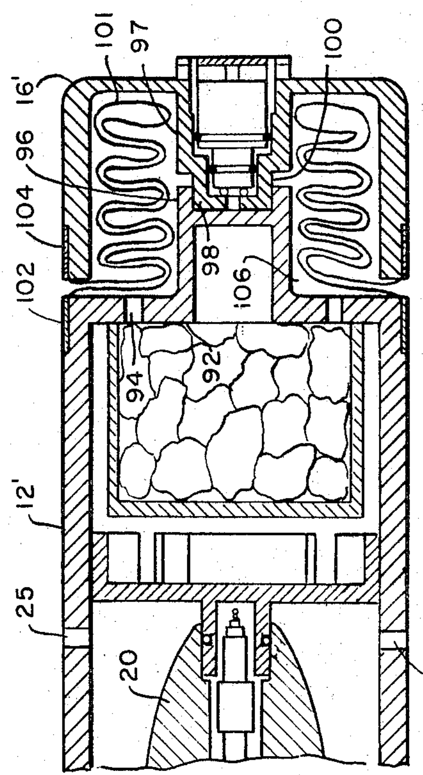
FIG. 5 is a view in section of an alternative embodiment of the float of FIG. 1A.

Referring now to FIG. 5 there is shown a second embodiment of the float member which will be described in connection with FIG. 1A above. In this embodiment the cannister 12' is similar to cannister 12 illustrated in FIG. 1A except that it is shorter in length and includes an end wall 92 having a plurality of openings 94 therethrough and terminating in a spindle 96 having a recessed opening 98 in the outer end thereof. There is further provided a cap member 16' having an internal spindle member 99 which terminates in a reduced diameter portion 100 which fits within the recess 98 in the cannister spindle 96. The cannister body 12' and cap member 16' are connected by a flexible extensible bag member 101. The bag member 101 comprises a flexible member of tubular shape which may be formed of any water impervious flexible material. One end of the tubular bag member is attached to the cannister body by means of retaining ring 102 while the other end is attached in a like manner to the cap member 16' by retaining member 104.

This embodiment forms a float assembly having the same buoyant capacity as that shown in FIG. 1A but requiring substantially less storage space than the solid cannister. This float is charged with buoyant gas in much the same way as that previously described above. The principal difference is that upon contact with the seawater, the buoyant gas generated by the chemical contained in the solid portion of the float flows through the holes 94 in the end wall of the cannister and into cavity 106 created by the cap member and the bag member. As the pressure in the cavity increases the cap member will be separated from the cannister body and the balloon member will extend to its full length to provide the buoyant float required to carry the probe member to the surface.

Figure 6:
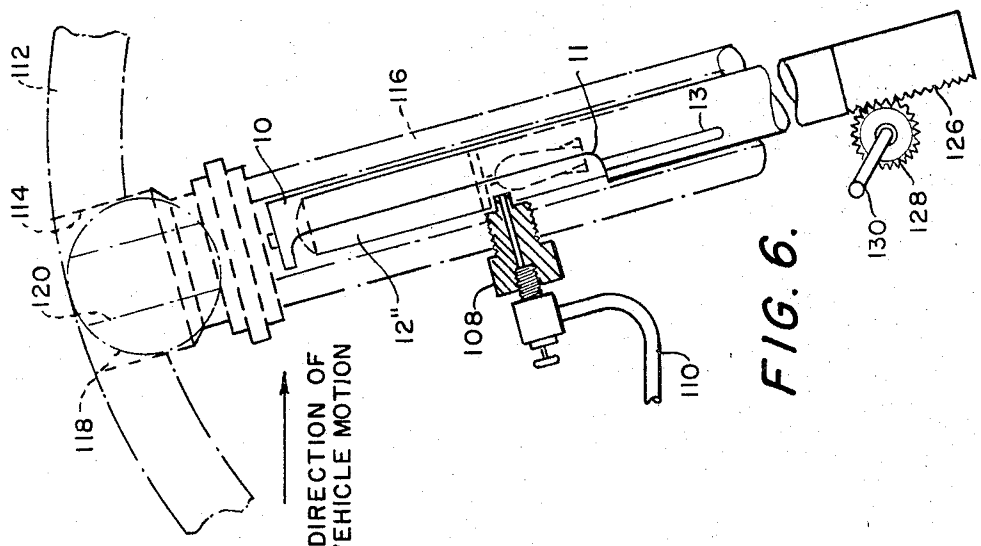
FIG. 6 is a view of the ejection tube aboard the vehicle with the launching apparatus in place therein and further illustrating an alternate embodiment of apparatus for charging the float member.

Referring now to FIG. 6 there is shown in addition to the vehicle launching apparatus a third embodiment for charging the float member with buoyant gas. In this embodiment a solid float member 12" is used and there is further provided a pressure fitting 108 which extends through the vehicle launching tube and into the cannister member. The pressure fitting is connected by conduit 110 to a source of pressurized gas (not shown). Upon launching of the probe there is introduced from the pressure source through fitting 108 a predetermined amount of buoyant gas for charging the float.

Referring again to FIG. 6 there is shown a wall portion 112 of the pressure hull of a submarine, the wall having an opening therein designated 114. A launching tube 116 pressure tightly surrounds the opening and extends into the interior of the vehicle, terminating in a water tight hatch therein. The opening 114 in the hull 112 is selectively opened by a door of any suitable design and shown here as a rotatable ball member 118 having a transverse opening 120 therethrough. When the launching tube 116 is to be opened to the external sea the ball member 118 is rotated such that the opening 120 is in alignment with the axis of the tube.

There is provided at the internal end of the launcher means for extending and retracting the launcher through the opening 120 for carrying the launcher and probe outside of the vehicle hull. The extension means shown comprises gear teeth 126 provided on the launcher to form a rack and a pinion 128 turned by a crank member 130.

OPERATION OF THE DEVICE

The launching operation will be described in connection with the embodiment of the invention as shown in FIGS. 1A and 1B. The first step preparatory to launching the probe is the assembly of the cannister generally designated at 12 which is begun by inserting the proper predetermined amount of lithium hydride or equivalent gas generating chemical into the upper or float portion of the cannister. The amount of chemical placed in the float is determined by the depth from which the probe is to be launched. For example, assuming that it is desired to have the float rise through the water at a predetermined rate, launching from a depth of 100 feet requires approximately 1.8 grams of lithium hydride. For the same rate of rise from a launching depth of 600 feet approximately 10.5 grams of lithium hydride would be required. The chemical may be prepackaged in specified amounts or weighed out in accordance with the requirement for each launch. The lithium hydride is contained in a water soluable bag and may be in the form of loose granules or, if desired, prepared in compressed pellets of predetermined weight. After insertion of the chemical in the float portion of the cannister the cap member 16 is attached to the forward end of the cannister.

Next the probe member 20 is assembled onto spindle 26 as shown. The second cannister assembly comprising wall members 56 and 57, with cannister 66 assembled between them, is then placed in the launcher and spring clip 62 is installed to attach the second cannister to the first cannister. The wall member 57 carries connector half 80 at the rear surface thereof.

The wall member 72 is permanently attached to launcher 10 by pins 85 and carries spindle 74 attached by spring clip 82. Wall member 70 is placed in the launcher on spindle 74 with pins 86 aligned with the slot 13 in the launcher shown in FIG. 6.

The two-cannister assembly is then placed in the launcher and the connector halves are connected. With the door of the signal launching tube, shown in FIG. 6, in the closed position, the launcher with its cannisters is inserted into the tube in the manner shown in FIG. 6. Appropriate connections are than made between cable 76 and recording instrumentation through the hatch closure at the interior end of the launching tube.

After all electrical connections are secured the door of the launching tube is opened to the sea by rotating ball 118 so as to align opening 120 with the axis of the tube and the launcher tube is flooded. Once the tube is flooded, seawater flows into the cannister through holes 25, through passages 24 and into the forward or float section of the cannister. Upon contact with seawater the soluable bag 28 is dissolved and the reaction between the lithium hydride and seawater takes places generating hydrogen gas in the float section. Since the launching tube is inclined toward the vertical the gas generated will flow toward the forward closed portion of the float and displace the water in the float section which will flow back out through openings 24 thereby causing the float to become buoyant.

The launcher is then manually advanced out through the launcher tube by means of the rack and pinion until the forward cannister 12 is just clear of the outer hull. As the cannister is held in the launcher only lightly by retainer 32, the inclination of the launching tube and the flow of water past the launcher caused by forward motion of the vehicle will cause the cannister to float free from the launcher through opening 11 and begin its ascent toward the surface.

As can be seen the wire conductors on the two spools is free to unreel when tension is applied to the conductors. In practice relative horizontal motion between the vehicle and the float draws wire from the stationary spool 68 in the launcher while vertical motion of the float causes wire to unreel from spool 50 within the probe member. The probe is maintained in assembly with spindle 26 of the cannister by the pressure difference between the hydrostatic pressure of the ambient seawater and the pressure contained between O-rings 42 and 49. As the cannister nears the surface and the pressure differential is reduced and gravity acting upon the head of the probe member will overcome the reduced pressure differential and the probe will fall free from the spindle. Upon contact between the seawater return 48 and the seawater the bridge circuitry of the sensor is completed through another seawater return at the vehicle initiating the measuring sequence which continues until the wire is exhausted from the spools at which point the wire separates and the probe falls to the sea floor.

At this time there is remaining in the launcher 10 the cannister 66 and its expended spool 68. To eject this expendable portion of the assembly the launcher is extended from its tube further away from the hull of the vehicle until the spring loaded pins 86 are clear of the door. When these pins clear the door they are forced outward by the spring 90 to a total length greater than the diameter of the door opening. The launcher is then retracted and since the extended pins cannot reenter the muzzle door the wall member 70 separates from spindle 74 carrying with it connector half 80 which separates from its mating connector 78. The expended cannister then falls free of the launcher and settles to the ocean floor. The launcher, carrying wall member 72 and connector half 78, is then retracted into the submarine and the door closed. The launcher may then be reused by connecting another cannister set as previously described.

Thus it is appreciated that there is herein provided apparatus for launching an expendible probe from a submerged vehicle which can be launched at varying depths with no major modifications of the launching apparatus. Additionally there is provided means whereby the probe may be made to rise in a constant rate irrespective of the depth at which it is launched. There is also provided means for ejecting other expendible apparatus and easily recovering the reusable portions.

It will be appreciated by those skilled in the art that the apparatus described herein additionally provides an inexpensive launching apparatus which is simple to operate and obviates the possibility of accidental damage prior to launching.

It is to be understood that the invention is not limited to the exact details of construction shown and described, for obvious modifications will occur to persons skilled in the art.

What is claimed is:

1. Apparatus for launching a sensor probe from a submerged submarine vehicle having a launching tube extending through the hull thereof, said apparatus comprising:
  a launcher slidably mounted in the launching tube and having an elongated opening in the side wall thereof;
  a cannister releasibly mounted in said launcher, in register with said elongated opening, said cannister being closed at one end and open at its other end and having at least one transverse opening in the wall thereof;
  first wall means attached within said cannister between the closed end thereof and said transverse openings for dividing said cannister into first and second chambers, said first chamber being defined by the closed end of said cannister and said first wall means, said wall means having at least one opening therethrough for providing a fluid passage between said chambers;
  a sensor probe attached at its forward end in sealing engagement with said first wall means within said second chamber;
  second wall means releasibly attached to said cannister at the open end thereof for retaining said sensor probe in said cannister;
  means for flooding the launching tube with water when said launcher and cannister are in place therein;
  means for charging said first chamber with buoyant gas for providing said cannister with positive buoyancy; and
  means for extending and retracting said launcher for a portion of its length outside the hull of said vehicle whereby said cannister is carried outside of the vehicle hull and released from said launcher through said elongated opening.

2. Apparatus for launching a sensor probe from a submerged vehicle according to claim 1 wherein said means for charging said first chamber with buoyant gas comprises:
  a water soluble container assembled within said first chamber of said cannister;
  a dry chemical compound contained within said water soluble bag, said chemical being of a type which generates a buoyant gas upon contact with water whereby said cannister is made positively buoyant upon flooding of said launching tube.

3. Apparatus for launching a sensor from a submerged vehicle according to claim 1 wherein said means for charging said first chamber with buoyant gas comprises:
  a pressure fitting removably inserted through the wall of said cannister and communicating with said first chamber of said cannister;
  a source of pressurized buoyant gas selectively connected to said pressure fitting whereby said cannister is made positively buoyant by connecting said source of pressurized gas to said pressure fitting.

4. Apparatus for launching a sensor probe from a submerged vehicle according to claim 1 wherein said cannister further comprises:
  a cap member releasably attached to the outward end of said cannister and forming a closure for said first chamber in said cannister;
  a tubular flexible member of water impervious material sealably attached at one end to said cap member and at the other end to said cannister means, said tubular member being folded within said cap member when said cap member is attached to said cannister whereby charging of said first chamber with buoyant gas causes said cap member to be released and said tubular member to be extended thereby forming a positively buoyant chamber for said cannister.

5. Apparatus for launching a sensor probe from a submerged vehicle according to claim 4 wherein said means for charging said first chamber with buoyant gas comprises:
  a water soluble container contained within said first chamber;
  a dry chemical compound contained within said water soluble container, said chemical being of a type which generates a buoyant gas upon contact with water whereby said cannister is made positively buoyant upon flooding of said launching tube.

6. Apparatus for launching a sensor probe from a submerged vehicle according to claim 4 wherein said means for charging said first chamber with buoyant gas comprises:
  a pressure fitting removably inserted through the wall of said cannister and communicating with said first chamber of said cannister;
  a source of pressurized buoyant gas selectively connected to said pressure fitting whereby said pressurized gas is admitted to said first chamber for providing said cannister with positive buoyancy.

7. Apparatus for launching a sensor probe from a submerged vehicle according to claim 1 wherein said probe member comprises:
  a head member having a central opening therethrough and sealably attached to said wall means at the forward end thereof;
  a flange member attached to the rear end of said head member;
  a spindle attached to one side of said flange member and extending through said central opening in said head member;
  sealing means between said spindle and the wall of said central opening near the attachment point of said flange member and said spindle;
  sensor means attached to the other end of said spindle means;
  first electrical conductor means attached to said sensor means and extending through said flange means;

a spool attached to the other side of said flange means;

a second electrical conductor means of predetermined length releasably wound upon said spool means and having one end thereof attached to said first electrical conductor means and the other end extending into said vehicle whereby the output of said sensor means is transmitted to said vehicle.

8. Apparatus for launching a sensor probe from a submerged vehicle according to claim 7 and further comprising:

a second cannister means releasably attached to the other side of said second wall means;

a third wall means slidably mounted in said launcher means at the other end of said second cannister means and having a central opening therethrough;

a second spool member mounted within said second cannister means;

third electrical conductor means of predetermined length releasably wound on said second spool means and connected at one end to said second electrical conductor means;

first water-tight connector means connected to the other end of said third electrical conductor means and slidably mounted in sealing engagement in said opening in said third wall means;

fourth wall means attached to said launcher means adjacent said third wall means and having a central opening therethrough;

second water-tight connector means sealably mounted within said opening in said third wall means and connected to said first connector means, said second connector means having fourth electrical conductor means connected thereto whereby the output of said sensor means is conducted into said vehicle.

9. Apparatus for launching a sensor probe from a submerged vehicle according to claim 8 wherein said third wall means has a transverse opening therethrough perpendicular to the axis of said central opening and further comprising:

first and second pins slidably mounted in opposite ends of said transverse openings;

spring means mounted in said transverse openings between said pins for extending said pins outward from said opening, said pins having a combined extended length greater than the diameter of the tube extending through the hull of said vehicle whereby said pins extend beyond said opening when said launcher is extended beyond said fourth wall means thereby causing said fourth wall means and said second cannister to be ejected from said launcher when said launcher is retracted into said tube.

References Cited

UNITED STATES PATENTS

| | | | |
|---|---|---|---|
| 3,273,181 | 9/1966 | Beck | 9—8 |
| 3,349,613 | 10/1967 | Francis. | |

JERRY W. MYRACLE, Primary Examiner

U.S. Cl. X.R.

9—8